Jan. 18, 1955 K. WANDEL 2,699,629
PROCESS OF PREPARING MULCH FOR AGRICULTURAL PURPOSES
Filed Aug. 10, 1950 2 Sheets-Sheet 1
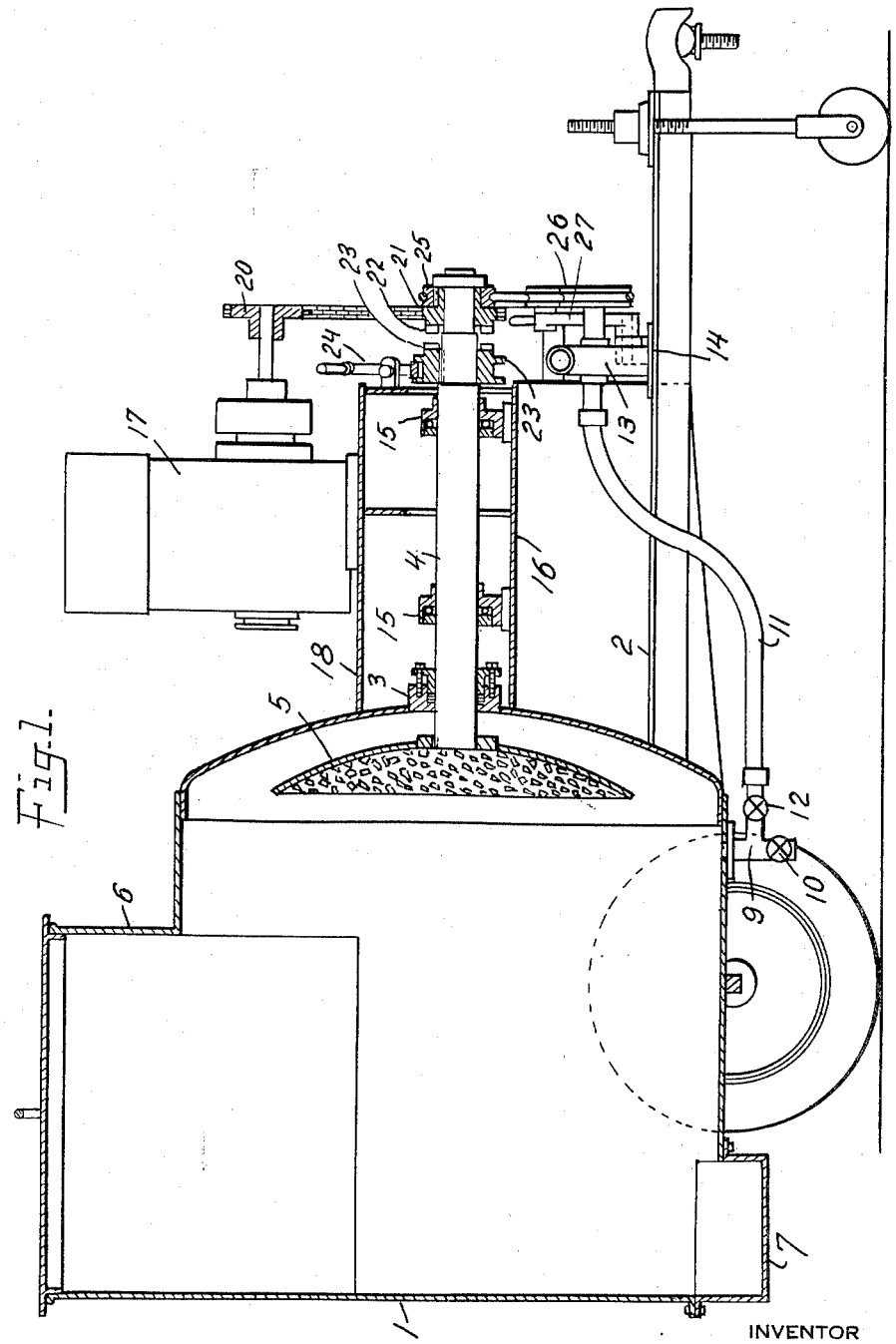
INVENTOR
KURT WANDEL
BY
Pennie, Edmonds, Morton, Barrows & Taylor
ATTORNEYS Jan. 18, 1955 K. WANDEL 2,699,629
PROCESS OF PREPARING MULCH FOR AGRICULTURAL PURPOSES
Filed Aug. 10, 1950 2 Sheets-Sheet 2
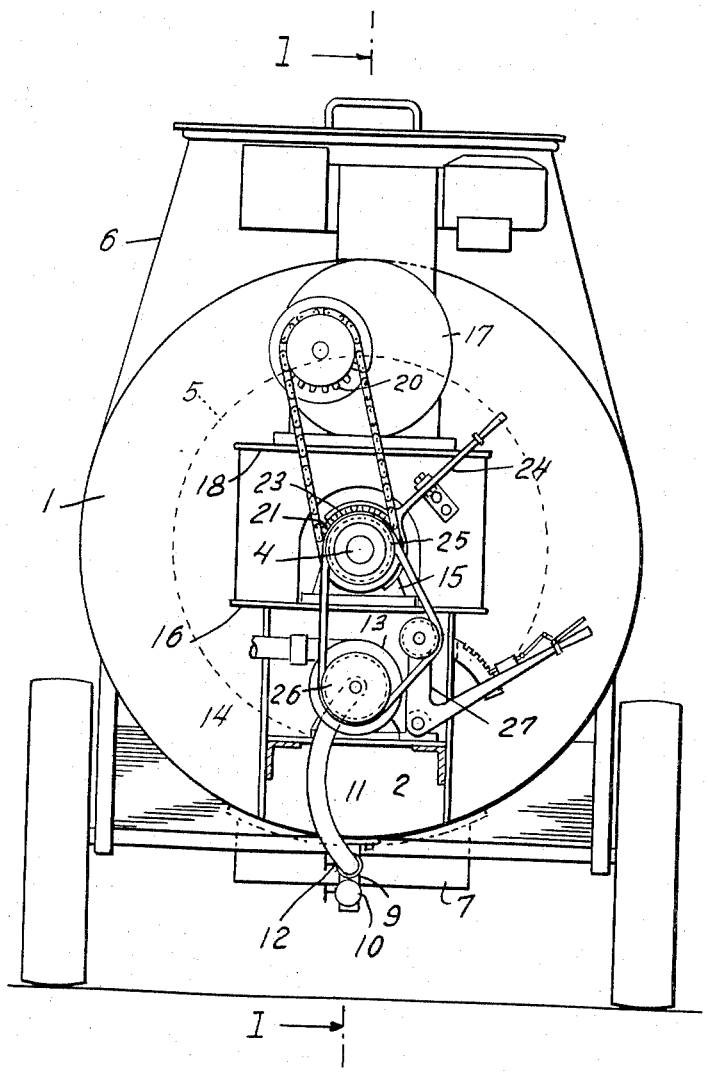
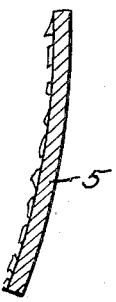
Fig. 3.
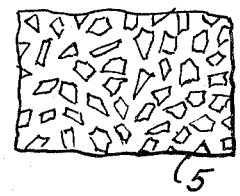
Fig. 4.
INVENTOR
KURT WANDEL
BY
Pennie, Edmonds, Morton, Barrows & Taylor
ATTORNEYS

United States Patent Office 2,699,629
Patented Jan. 18, 1955

2,699,629

PROCESS OF PREPARING MULCH FOR AGRICULTURAL PURPOSES

Kurt Wandel, Honey Brook, Pa., assignor, by mesne assignments, to Wilbro Corporation, Hackensack, N. J., a corporation of New Jersey Application August 10, 1950, Serial No. 178,565

6 Claims. (Cl. 47—9)

This invention relates to methods of growing vegetables and other plants, and to apparatus for carrying out such methods.

It has heretofore been proposed to mulch vegetable plants and other growing plants with a mulch consisting essentially of a pulp made from waste paper and the like which on drying serves as an insulating protective layer covering the soil surrounding the plant and serving to retain the moisture therein and at the same time prevent the growth of weeds and grass. Mulches of this character may be used with considerable advantage in gardening and the like, and serve not only to improve the growth of the plant but also to considerably reduce the labor required for weeding and cultivating the soil around the plant.

A mulch formed of paper pulp absorbs water rapidly when it rains or the plants are watered, and when wet transmits the water to the earth beneath the mulch, but dries quickly to restore the layer which, unless mechanically destroyed, will remain intact for the usual growing season.

My present method of plant culture has for its object an improvement on the above-described method primarily in providing a mulch which not only serves the purposes above described, but also fertilizes the plants with organic nutrients in a manner to not only add greatly to the growth of the plants, but also to effect a permanent improvement in the soil.

Primarily, my improved method consists in utilizing for the mulch, organic refuse material such as garbage, stable manure, dried leaves, grass clippings and all other organic material available in the maintenance of a farm or country residence, and in distintegrating such refuse in water to thereby produce a water suspension of the fibrous material and other insoluble components with the water soluble ingredients in solution. When this mulch is spread, the water which will soak into the ground and the soluble matter in the organic material from which the mulch is made will be immediately utilized by the plants, leaving on the surface a mulch of fibrous material similar in its action to the mulch of paper pulp above described, but differing therefrom in that, in addition to the cellulose fibers which are resistant to decay, the mulch contains a high percentage of finely comminuted organic material which gradually decays and continuously adds nutrients to the soil.

To prepare the mulch I preferably employ a machine such as illustrated in the accompanying drawings. This machine is generally similar to the machines employed for disintegrating waste paper for re-use in the manufacture of paper, but with certain modifications to adapt it to the disintegration of a wide variety of organic waste. The waste material, after reduction, in the apparatus abovementioned, to a water suspension as described, is spread on the soil by means of a pump and a hose which may be incorporated as part of the apparatus, and in the accompanying drawing I have illustrated a complete portable apparatus for the purpose.

In the said drawings,

Fig. 1 shows the apparatus in vertical section on line 1—1 of Fig. 2;

Fig. 2 is a front view of the apparatus; and

Figs. 3 and 4 are detail views of the distintegrating impeller.

Referring to the drawings, particularly Fig. 1, 1 indicates a tank, preferably of cylindrical form and supported with its axis horizontal on a suitable cart or carriage 2. The end of the tank is provided with a bearing 3 in which is mounted a shaft 4 having its axis coincident with the axis of the tank. Then end of the tank is preferably convex, as shown, and within the tank there is attached to the end of the shaft a concave disk impeller 5 of a diameter about two-thirds that of the tank, the face of the impeller having welded to it in random arrangement discrete separate particles of carborundum or other hard abrasive having angular faces and sharp edges. Impellers of this construction have been found to give satisfactory results with the various materials above-mentioned, but other forms of impellers such as those now used for disintegrating waste paper may, however, be employed.

The material to be disintegrated is preferably charged into the tank at the end away from the impeller 5, and for this purpose I preferably provide on the top wall of the tank 1 a hopper 6. At the bottom of the tank beneath the hopper there is preferably provided a pocket in the form of a metal box 7 bolted to the bottom wall of the tank and surrounding a hole cut in the bottom wall. The purpose of the pocket 7 is to catch and retain heavy insoluble pieces such as bits of rock, nails and the like which are liable to be picked up with the refuse when it is charged into the hopper.

The bottom wall of the tank is also provided with a discharge outlet 9 in the form of a T with a discharge valve 10 in the downwardly extending branch of the T and a hose 11 connected to the horizontal branch of the T, which may also be provided with a cut-off valve 12. The hose 11 is connected to a pump 13 which is preferably arranged to be driven from the same source of power as the impeller 5. To this end the pump is mounted as shown on the frame 14 of the cart 2 immediately beneath the drive shaft 4 of the impeller which is extended forward from the end of the tank through suitable bearings 15 supported, as shown, on a frame 16 mounted on the frame of the cart.

Power may be supplied by a suitable electric motor or internal combustion engine and in the accompanying drawing I have shown an engine 17 mounted on a superstructure 18 above the shaft 5 of the impeller. The engine shaft is provided with a drive sprocket 20 which in turn drives a sprocket 21 rotatably supported on the shaft of the impeller 5. The hub of the sprocket 21 is provided with clutch teeth 22 co-operating with the teeth of clutch member 23 keyed to the impeller shaft. The clutch member may be locked in engaged and disengaged position by a lever and latch bar 24 in the usual manner.

The sprocket 21 is formed with a belt flange 25 from which the pump 13 is driven through a pulley 26 attached to the pump shaft.

A belt tightener 27 is provided so that the operation of the pump may be controlled at will. By this construction the pump may, if desired, be operated while the impeller is being driven, which is sometimes desirable, but ordinarily the charge in the tank will be completely disintegrated by the impeller before the cart is moved to the point of delivery of the mulch. Any suitable type of pump may be employed. I have found sludge pumps such as customarily used for sewage disposal to be entirely satisfactory for the purpose.

In carrying out my improved method of mulching and fertilizing the tank 2 is filled with water to a sufficient depth to cover the upper edge of the impeller. To this water is added a quantity of organic refuse matter such as garbage, dry leaves, grass clippings, stable manure, straw and the like. The material added should be in an amount such as to provide about 5% insoluble fibrous matter based on the weight of the water in the tank. The amount is not critical, but better disintegration is obtained and the resulting pulp is easier to handle if the percent of fibrous matter is not substantially greater than 5%. A dilute mulch is undesirable in that the surplus water content merely adds to the bulk of the material to be handled without adding to the nutrients fed to the plants or to the thickness of the mulch. A fiber content of the order of 5% is also desirable so that there will be left on the ground sufficient fibrous matter to form a mulch thick enough to retard evaporation and prevent the growth of weeds, grass and the like. If the organic matter making up the charge is largely soluble organic refuse without much fiber content, fiber may be added in the form of waste paper or other fibrous material which of itself contains no soluble organic matter.

The operation of the impeller apparently completely destroys the cell structure of the organic matter in the charge and expedites the solution of the water-soluble ingredients making up the charge. The action of the impeller also serves to liberate the cellulose fibers in the mass and at the same time reduces to a fine state of subdivision nonfibrous solid matter which is insoluble but which upon exposure to weather and subjection to the bacteriological processes of decay, become available as plant nutrients. By this fine subdivision of the ingredients of this nature in the charge the time required for them to be available as plant nutrients is greatly reduced. There thus results from the practice of the process a supply to the plants contiguous to which the mulch is applied, an immediate supply of nutrients from the water-soluble ingredients of the charge and also an application to the soil of humus-forming ingredients in a condition to be more quickly available than when merely worked into the soil in the customary manner and in addition the formation of a mulch of predominantly cellulose fibers which retards evaporation of the moisture in the ground and at the same time prevents the growth of weeds and grass.

In carrying out my improved process the mulch may be applied immediately after the plants have been set out or if seed is to be planted instead of growing plants, the mulch may be applied to the ground when prepared to receive the seed, and the seed then planted, the mulch immediately over the location of the seed being sufficiently mixed in with the dirt to prevent the formation of drying of a continuous mat of mulch. The insoluble fibers deposited on the surface by the application of the mulch dry rapidly and form a porous mat having sufficient adherence to the ground to resist displacement by wind or rain of ordinary intensity. The mat is, however, immediately softened by rain or watering, permitting the transmission of water to the soil beneath without hindrance, but dries quickly and again forms an opaque covering of sufficient continuity to prevent the growth of weeds and grass. The freshly prepared mulch may be repeatedly added to the soil alongside growing plants, each addition adding further plant nutrients to the soil to be immediately available for the plant growth and simultaneously building up the mulch to maintain its continuity so that beds treated with the mulch require no cultivation throughout the entire growing season.

My improved process thus serves not only to improve plant growth and lessen the labor required for cultivation, but also provides an excellent system of garbage disposal. During a course of experiments utilizing fresh garbage, stable manure, poultry house refuse and various other organic material which as such is subject to putrefaction, it has been observed that after treatment in the disintegrator the mass is no longer subject to putrefaction and is entirely odorless. The reason apparently is that the cell structure of the organic matter is destroyed by the disintegrator and that such cell structure is necessary for bacterial action to take place. The natural processes through which organic refuse must go before being again available for plant growth apparently involve two distinct stages—namely, putrefaction, a bacterial action which destroys the cell structure of the organic matter with resultant formation of gases and release of liquid content, and a second stage involving both chemical reaction and biological action by which the carbohydrates and proteins making up the plant structure are reduced to so-called humus. Apparently in the operation of the disintegrator the organic material is reduced to a physical state similar to that resulting from bacterial putrefaction and is thereby rendered immediately available for the second stage of the natural process above described.

Instead of applying the disintegrated organic material to the soil at the time of planting, it may be advantageously applied during the winter months either before or after the ground is prepared for planting. In truck farming, for example, after the final gathering of vegetables in the fall, the plot may be advantageously plowed and harrowed or otherwise tilled. The surface may then be covered with mulch prepared in the above described manner which can be added to until the layer of insoluble matter retained on the surface is of sufficient thickness to prevent the growth of weeds and grass. In the spring the mulch may be broken up and worked into the soil by harrowing or otherwise or the plants or seeds may be planted directly in the mulch-covered plot by breaking up the mulch only at localities overlying the seeds or plants.

Instead of applying the mulch in water suspension to the plot being cultivated, the water suspension may be dried and the fertilizer used as a dry fertilizer in lieu of the dried humus and other forms of dried organic fertilizer now on the market. The drying may be readily accomplished by spreading the mulch on the ground, so that the water in the suspension will in a large measure soak into the ground, reducing the time of drying. In this procedure the mulch may be spread considerably thicker than necessary for a satisfactory mulch for growing plants.

When dried on the ground as above described, there is of course a loss of the water soluble ingredients of the refuse matter making up the charge. This may be avoided by spreading the mulch on a fine screen overlying a cemented area sloping to drain the water to a sump from which it may be drawn for use in watering the growing plants. Where it is desirable to save water, the water drained out of the mulch may be used repeatedly in the disintegrator, thereby building up its content of soluble organic matter to a fairly high concentration before it is used. Also, of course, liquid manure may be added to the water used in preparing the mulch.

My process may be used for the disposal of refuse and garbage on a large scale with the production of a dry fertilizer and mulch which is easily handled, is odorless and which not only furnishes plant nutrients but adds a mulch to the surface which has the same advantages as when applied wet in the manner above described.

In utilizing collected city refuse and garbage a water suspension of the disintegrated waste is prepared in the manner described and is then delivered to a traveling screen such as used in paper manufacture from which the greater portion of the water is removed by drainage and reused in the disintegration, making necessary the addition only of water to replace the water lost by evaporation. The web is then dried by hot air or otherwise and the dried web of pulp crushed by rollers or otherwise to a condition where it may be readily packed in sacks and handled in the same manner as other dried fertilizers and mulchers such as buckwheat hulls. When spread on the ground and watered the dried water soluble ingredients will be carried into the ground to be immediately available for plant nutrition and the insoluble matter will form a layer of mulch similar to the mulch resulting when the freshly disintegrated waste is spread on the ground.

The mulch, prepared in the manner above described from a mixture of garbage, grass cuttings, dead leaves, straw, stable manure and the like, is a porous and friable mat which can be readily pulverized and bagged after the manner of other dried fertilizers.

It will of course be understood that the apparatus illustrated for preparing the mulch may be variously modified and that the procedure above described may also be altered to meet varying conditions without departing from the spirit of my invention or the scope of the appended claims.

I claim:

1. The method of treating refuse containing garbage and other fresh organic matter of a character subject to putrefaction which consists in subjecting such refuse at room temperature to mechanical disintegration in the presence of water sufficient for the solid content of the mixture to be not more than 8%, continuing the disintegration for such period that any contained waste paper or like fibrous matter is separated into its constituent fibers and the mass is reduced to a free-flowing pulp which is substantially free from odor and no longer subject to putrefaction.

2. The method of utilizing refuse containing garbage and other fresh organic matter of a character subject to putrefaction in the cultivation of growing plants which consists in subjecting such refuse to mechanical disintegration in the presence of water sufficient for the solid content of the mixture to be not more than 8%, continuing the disintegration for such period that any contained waste paper or like fibrous matter is separated into its constituent fibers and the mass is reduced to a free-flowing pulp which is substantially free from odor and no longer subject to putrefaction, and then spreading the pulp on the ground adjacent the location of the growing plants.

3. The method of claim 1 wherein the pulp is further treated to remove therefrom sufficient water to form a stable, self-preserving, plant food.

4. The method of claim 3 wherein the water removed is in the order of 80%.

5. The method of claim 4 wherein a substantial proportion of the water is removed by mechanical extraction.

6. The method of claim 5 wherein the extracted pulp is air dried.

References Cited in the file of this patent

UNITED STATES PATENTS

| Number | Name | Date |
|---|---|---|
| 533,896 | Holthaus | Feb. 12, 1895 |
| 673,167 | Giffen | Apr. 30, 1901 |
| 769,104 | Morse | Aug. 30, 1904 |
| 970,711 | Hoskins | Sept. 20, 1910 |
| 1,405,952 | Stuart | Feb. 7, 1922 |
| 1,543,939 | Maclachlan | June 30, 1925 |
| 1,832,179 | Boggiano-Pico | Nov. 17, 1931 |
| 1,931,248 | Bryant | Oct. 17, 1933 |
| 1,962,806 | Clapp | June 12, 1934 |
| 1,978,102 | Clapp | Oct. 23, 1934 |
| 2,043,265 | Roeder | June 9, 1936 |
| 2,241,734 | Petersen | May 13, 1941 |
| 2,474,833 | Eweson | July 5, 1949 |
| 2,625,471 | Mowry | Jan. 13, 1953 |

FOREIGN PATENTS

| Number | Country | Date |
|---|---|---|
| 717,898 | Germany | Feb. 25, 1942 |
| 741,483 | Germany | Nov. 11, 1943 |

OTHER REFERENCES

Farmers' Bulletin No. 1950, published March 1944, page 30.

Farmers' Bulletin No. 1950, revision published 1946, page 26.

Transactions, American Society of Civil Engineers, International Engineering Congress, 1904, Paper 67, "Disposal of Municipal Refuse," by P. Tur, pages 309–317.

Morse: "The Collection and Disposal of Municipal Waste," 1st ed., 1908, p. 40.